United States Patent [19]
Kähler

[11] Patent Number: 5,888,262
[45] Date of Patent: *Mar. 30, 1999

[54] FILTER INSERT AND PROCESS FOR PRODUCING IT

[75] Inventor: Kai Kähler, Hamburg, Germany

[73] Assignee: "JACOBI" Systemtechnik GmbH, Weissig, Germany

[*] Notice: This patent issued on a continued prosecution application filed under 37 CFR 1.53(d), and is subject to the twenty year patent term provisions of 35 U.S.C. 154(a)(2).

[21] Appl. No.: 666,540

[22] PCT Filed: Dec. 30, 1994

[86] PCT No.: PCT/DE94/01558

§ 371 Date: Jun. 28, 1996

§ 102(e) Date: Jun. 28, 1996

[87] PCT Pub. No.: WO95/17943

PCT Pub. Date: Jul. 6, 1995

[30] Foreign Application Priority Data

Dec. 30, 1993 [DE] Germany ............... 43 45 121.7
Dec. 21, 1994 [DE] Germany ............... 44 47 365.6

[51] Int. Cl.[6] .................... B01D 29/21; B01D 27/06
[52] U.S. Cl. .................... 55/497; 55/521; 55/527; 55/DIG. 5; 210/493.5
[58] Field of Search .............. 55/497–502, 511, 55/514, 521, 527, DIG. 5; 210/493.5

[56] References Cited

U.S. PATENT DOCUMENTS

| | | | |
|---|---|---|---|
| 2,784,802 | 3/1957 | Bub et al. | 55/521 |
| 2,936,855 | 5/1960 | Allen et al. | 55/498 |
| 2,945,559 | 7/1960 | Buckman | 55/502 X |
| 2,968,361 | 1/1961 | Buckman | 55/498 X |
| 3,198,336 | 8/1965 | Hyslop | 55/521 X |
| 3,279,615 | 10/1966 | Stokes | 55/498 X |
| 3,280,985 | 10/1966 | Czerwonka | 55/497 X |
| 3,531,920 | 10/1970 | Hart | 55/497 |
| 3,633,756 | 1/1972 | Buckman | 55/498 X |
| 3,716,970 | 2/1973 | Stupf et al. | 55/500 X |
| 3,799,354 | 3/1974 | Buckman et al. | 55/521 X |
| 3,871,851 | 3/1975 | Neumann | 55/521 |
| 4,268,290 | 5/1981 | Barrington | 55/521 |
| 4,452,619 | 6/1984 | Wright et al. | 55/498 X |
| 4,610,706 | 9/1986 | Nesher | 55/497 |
| 4,615,804 | 10/1986 | Wright | 55/500 X |
| 4,732,678 | 3/1988 | Humbert, Jr. | 55/498 X |
| 5,028,331 | 7/1991 | Lippold | 55/521 X |
| 5,053,131 | 10/1991 | Lippold | 55/521 X |
| 5,066,319 | 11/1991 | Lippold | 55/521 |
| 5,066,400 | 11/1991 | Rocklitz et al. | 55/521 X |
| 5,071,555 | 12/1991 | Enbom | 55/500 X |
| 5,080,790 | 1/1992 | Widmann | 55/497 X |
| 5,089,202 | 2/1992 | Lippold | 55/521 X |
| 5,236,480 | 8/1993 | Svensson et al. | 55/497 X |
| 5,290,447 | 3/1994 | Lippold | 55/521 X |
| 5,306,321 | 4/1994 | Osendorf | 55/498 X |

FOREIGN PATENT DOCUMENTS

| | | | |
|---|---|---|---|
| 0377419 | 7/1990 | European Pat. Off. | |
| 0382330 | 8/1990 | European Pat. Off. | |
| 3037019 | 6/1982 | Germany . | |
| 3903730 | 8/1990 | Germany . | |
| 4038966 | 6/1992 | Germany . | |
| 4126126 | 2/1993 | Germany . | |
| 4206407 | 9/1993 | Germany . | |
| 06-007621 | 1/1994 | Japan | 55/497 |
| 06-262022 | 9/1994 | Japan | 55/521 |

*Primary Examiner*—Robert Spitzer
*Attorney, Agent, or Firm*—Venable; George H. Spencer; Catherine M. Voorhees

[57] ABSTRACT

A filter insert (1A) for a fluid filter with an outer square or hollow cylindrical shape has a plurality of continuous zigzag folded walls (5) made of a fluid-permeable material (2) and provided in the plane of at least part of the folded walls with stiffening embossed depressions (3) and/or projections for keeping the walls folded. The depressions and/or projections of adjacent folded walls are interconnected at least in part and supported on each other. Stiff spacers are provided between the depressions or projections in at least part of their length for interconnecting them and supporting them on each other.

23 Claims, 14 Drawing Sheets

22  26b  25  21  26a  23a  23b

FILTER INSERT AND PROCESS FOR PRODUCING IT

BACKGROUND OF THE INVENTION

The invention relates to a filter insert including a material permeable to fluid and having a number of planar fold walls arranged in a substantially continuous zigzag shape and including depressions and/or elevations stamped into the plane of at least a part of a respective one of the fold walls in order to stiffen the fold walls, the depressions and/or elevations of adjacent fold walls being connected to one another at least partially and being supported on one another.

Filter inserts of the above types are used to remove contamination from a fluid flowing through a filter, particularly air or industrial gasses, but theoretically liquids as well. At present, filter elements consisting of a micro fibre fleece, particularly glass fibres, are predominantly used in air filters.

In order to increase the effective filter area relative to the inflow surface of the air filter which forms a filter element or filter area, the filter medium is folded in a zigzag shape so as to produce a number of folds adjoining one another via fold edges, which are located at an acute angle to the walls of the folds and through which the medium to be purified flows at right angles to the direction of the fold edges.

As a result of the depositing of material, and particularly the settling of larger particles, on the inflow side of the filter, turbulence in the inflowing fluid, slight irregularities in the folds, etc, inhomogeneities may occur in the fluid flow as the fluid flows through the filter, thereby subjecting the fold arrangement to strong mechanical alternating stresses and possibly bringing about deformation of the fold arrangement.

In order to hold the folds at a specified distance from one another and mechanically stabilise the fold arrangement of the filter insert, the folds are therefore provided with projections protruding from the plane of the fold walls, as described for example in U.S. Pat. No. 3,531,920 or, according to another special embodiment, in DE 41 26 126 A1, in such a way that the projections of adjacent fold walls abut on one another and the fold walls support one another. In order that the fold walls are directed at an inclined angle to the incoming fluid, ie. the fold layers are substantially triangular in cross section, the projections must also be approximately triangular or trapezoidal in cross section.

These arrangements have proved suitable for filter inserts with a fold height up to about 100 mm, with relatively tightly packed folds. Beyond this fold height and with larger fold spacings, however, the depth of impression required is so great that, with conventional filter materials, there is the risk of the folds being punched through, thereby unacceptably increasing the number of rejects.

It is also known from DE 40 38 966 to place separate spacers with the same function on the fold walls or to insert said spacers therein. The spacers may be adhesive aggregates, particularly in fibre form, as mentioned as a possibility in the specification referred to above or as illustrated in DE 30 37 019 A1. In addition to acting as spacers, they also have the effect of connecting the fold walls and thus further increasing the rigidity of the filter insert.

The adhesive is applied before the folding of the filter material onto the flat strip, and the fold walls are adhered by the contact of the adhesive threads with one another during the folding operation. This solution is therefore only suitable for very densely packed folds. In addition, the fold layers formed in this way tend to have a meandering configuration in cross section, which does not lead to optimum flow qualities.

DE 39 03 730 A1 describes how an adhesive thread which joins the fold layers together and stabilises them and which may be applied to the edge area after folding, is combined with impressions in the fold walls. This solution results in mechanically very stable filter inserts, but is subject to essentially the same restrictions as the solutions without adhesive in terms of the fold height and fold spacing which can be achieved.

DE 42 06 407 describes how the fold edge area of a previously folded length of filter material is covered with a fine web of adhesive threads in order to join the folds together and stabilise the filter insert. This solution is no longer practical for larger fold spacings since the fine adhesive web cannot produce a sufficiently stable attachment of fold edges which are spread further apart and the filaments of the web "sag" (particularly when applied from below to a folded material located above during the manufacturing process) and do not assume a defined position relative to the fold edges.

From EP 0 377 419 A1 an arrangement is known in which adhesive aggregates of varying sizes (larger at the top and smaller at the bottom) located in the top and bottom areas of a fold wall arrangement which is to be formed are to be used to adhere walls of folds in a manner such as to produce a substantially triangular cross section of fold. However, larger fold spacings and heights cannot be achieved by this method because extremely bulky adhesive aggregates would be required which would greatly reduce the effective filter surface.

SUMMARY OF THE INVENTION

It is an object of the invention to provide a filter insert of the kind described which, by virtue of its very construction, makes it possible to produce filter inserts of considerable height and/or considerable fold spacings, as well as a process for producing this filter insert.

The above and other objects are accomplished according to the invention by the provision of a filter insert for a fluid filter, comprising: a material permeable to fluid and having a number of planar fold walls arranged in a substantially continuous zigzag shape and including depressions and/or elevations stamped into the plane of at least a part of a respective one of the fold walls in order to stiffen the fold walls, wherein the depressions and/or elevations each have a longitudinal extent and adjacent fold walls connected at a common fold edge define a fold; and rigid spacers joining a part of the longitudinal extent of the depressions and/or elevations of adjacent fold walls.

According to a further aspect of the invention there is additionally provided a process for preparing a filter insert for a fluid filter, comprising steps of: providing a length of fluid-permeable material with a layer of impressions which determine future fold edges that define future fold walls when the material is folded along the impressions; stamping depressions and/or elevations into a plane of at least a part of the future fold walls in order to reinforce the future fold walls; folding the material along the impressions to form fold edges and to form a substantially continuous zigzag shape of fold walls so that the depressions and/or elevations of adjacent fold walls are placed together; and applying, before or during the folding, a spacer material to the depressions and/or elevations placed together as a result of the folding.

The invention includes the idea of producing the considerable height of spacers between the folds which are required for large fold spacings or a high fold height (with consequent areas having a large fold spacing) by a combination of spacers stamped into the filter material and separate spacers applied to the filter material. This means that, when using the application of adhesive, known per se, this must be of appreciable thickness or height at least on those areas where the fold walls to be connected together have a considerable spacing, and it also means that the height of the separate spacer need not be constant over the length of a fold wall, ie. from the bottom or "point of the fold" to the very tip of the fold.

This can be achieved in particular by making the separate spacers continuously thinner towards the "point of the fold" in harmony with the reduction in the cross section of the fold in question.

It can also be achieved by providing two or more separate spacers in the direction of the longitudinal extent of the depressions or elevations in the filter material and by having one spacer, adjacent to the "point of the fold", thinner than a spacer located further away. If the application of adhesive is used for production, this may have a constant thickness within the two (or more) separate areas or islands of adhesive, so that there is no need to change the cross section continually.

In another embodiment, an applied (adhesive) spacer may be provided solely in those areas where the fold walls are at a large spacing, whilst in the tighter areas of the fold walls there is no spacer or the adhesive is of negligible thickness, the quantity applied being such that it essentially penetrates into the filter material.

The spacers may be constructed in their overall height so that the height of the recesses or elevations stamped into the material is substantially constant in the direction of the longitudinal extent thereof, ie. the change in height required according to the zigzag shape of the fold cross section results exclusively from the change in thickness of the separate spacer (of the applied layer). The filter material may, for example, be provided with substantially continuously grooves.

On the other hand, however, the construction may be such that the height of the recesses or elevations in two fold walls resting against each other decrease towards the fold edge connecting these fold walls together. Thus, both the indentations and the added spacers help to achieve the change in spacing.

The embodiments mentioned are suitable both for filter inserts in which the folding secures a body shaped like a block, ie. for use as an air or gas filter in the natural gas and petroleum industry, in energy saving or for air ventilation and air conditioning plant. However, they are also suitable for cylindrical filter inserts in which the folding secures a body shaped like a hollow cylinder, ie. for use in air filters for motor vehicles.

In an advantageous special embodiment of the depressions or elevations stamped into the filter material, the latter have a first section of increasing height and a second section of constant height, arranged one after the other in the direction of longitudinal extent.

In a preferred embodiment thereof, at least in part of the second portion of elevations facing one another, there is a spacer (adhesive aggregate), the thickness of which, together with the sum of the heights of the elevations (which are constant in this part) correspond to the spacing to be achieved between adjacent fold walls at the site of the adhesive aggregate. The adjacent fold walls are simply supported on one another by means of the elevations and the adhesive aggregate and at the same time join together with a degree of stability which is adequate for numerous applications.

It is also possible for a number of adhesive aggregates located at individual points and having different heights to be provided in the second part of the length of the elevations.

The adhesive aggregate may, in particular, be a layer of adhesive running along the longitudinal extent of the elevation, substantially covering the second part of the length thereof (ie. the part having a constant height) and becoming increasingly thicker as its distance from the fold edge or from the first part of the elevation increases. Compared with one or more adhesive aggregates applied only at isolated points, adhesion is more stable, but this embodiment requires more precise control of the application of adhesive.

A further increase in the stability of the filter insert can be achieved if a cohesive layer of adhesive is provided along the entire length of elevations facing one another, this layer then having a constant thickness, which is minimal compared with the height of the elevations, in the first part of its length and having a thickness which increases as the spacing of the fold walls increases, in the second part of its length.

With regard to the exact location of the elevations or depressions, there are two basic possibilities to distinguish:

On the one hand, the first part of the depressions or elevations may start immediately at a fold edge, the height thereof then increasing from this point to the maximum height with a pitch which corresponds to half the pitch of the wall spacing.

On the other hand, the depressions or elevations may begin at a predetermined spacing (a) from a fold edge and then have a third part located between the fold edge and the above-mentioned first part in which their height initially increases more than half the spacing of the fold walls until it reaches a height corresponding to half the wall spacing. This embodiment has the technological advantage that there is no need for numerous indentations in the immediate vicinity of the fold edge, which in any case is provided by an indentation in the filter fleece. This reduces the risk of damage to the filter fleece at this point and hence the reject quota.

For reasons of stability, indentations or elevations facing in two directions will be stamped into the fold walls, so that the fold walls are supported on adjacent fold walls. However, this is not absolutely necessary.

Depending on the particular construction of the spacers, the process according to the invention may be carried out so that the quantity of adhesive applied per unit of length in the direction of the longitudinal extent of the indentation of elevation carrying the spacer with decreased thickness is designed to decrease towards the indentation which marks the eventual "point of the fold".

Alternatively, or in conjunction therewith, the application of adhesive may be interrupted at least once in the direction of the longitudinal extent of the indentation or elevation carrying it and the quantity of adhesive applied per unit of length of the strip of filter material, beyond the interruption, towards the indentation which marks the position of the "point of a fold" may be less than the amount used this side of the interruption, ie. in the wide open part of the fold, where the spacer has to be higher up.

According to an advantageous combination of both possibilities, the adhesive is supplied continuously, one after another (through a plurality of nozzles or in some cases by simply guiding the same nozzle over the area in question) and above or below this adhesive is applied discontinuously. Using this principle, a variety of spacer profiles can be produced.

For the filtering performance it is beneficial if the smallest possible surface of the filter material is covered with the spacer (the adhesive).

This can be achieved if the application is spatially precisely defined, preferably essentially linear, ie. smaller in width than the length of the layer. This presupposes the choice of a suitable adhesive—with wetting properties matched to the filter material—and the correct choice of a pasty to gel-like consistency, so that at least the adhesive is spread broadly over the filter material before it hardens, but if possible a spatially precisely defined adhesive aggregate can be applied to the filter material.

The quantity of adhesive applied per unit of length of the filter material can be varied—as a theoretical possibility—by varying the quantity of adhesive delivered per unit of time from an applicator device to the length of material travelling past. In order to vary the quantity of adhesive per unit of time, the cross section of the outlet opening of the applicator device can be adjusted accordingly, ie. specifically its cross section can be reduced as it comes closer to the fold lines which are to mark out the future "points of the folds" and enlarged again as it moves away from these lines.

Additionally or alternatively, in order to very the quantity of adhesive per unit of time, it is possible to control the delivery pressure from the applicator device accordingly.

Another possibility, which may in turn be combined with the other possibilities, is to apply the adhesive in several layers one on top of the other over partial areas of the longitudinal extent of the spacers. This can again be achieved by means of a plurality of nozzles of by simply spreading the areas over an dover again with the same nozzle.

Finally, again in combination with one or more of the other possibilities, the quantity of adhesive applied per unit of length of the strip of filter material can be changed by varying the relative speed between the length of material and the outlet opening of an applicator device.

Specifically for producing the filter insert with indentations having one area of increasing height and one area of constant height, the quantity of adhesive applied per unit of length of the material, in the direction of the longitudinal extent of the elevations, is appropriately maintained at a predetermined first level over the first part and increased steadily from the first level upwards over the second part, the first value particularly being 0, ie. there is no need for any application of adhesive in the first part.

It should be noted that, in the present embodiments, the material which is permeable to the fluid includes any conventional filter materials or those which may be used for certain fluids, particularly fibre fleeces of cellulose, glass fibres, mineral fibres or ceramic fibres, fine-meshed fabrics with or without impregnation, etc, and the adhesive referred to include the materials which can be used together in order to form a material connection between such materials, especially adhesives in the narrower sense, but also thermoplastic or foam materials or the like which will adhere to the filter material.

The essentially zigzag-shaped continuous folding also includes two fold arrangements in which the fold cross section perpendicular to the fold edges is substantially trapezoidal or the fold edges are rounded.

BRIEF DESCRIPTION OF THE DRAWINGS

Other advantageous features of the invention are described hereinafter by the following description of the preferred embodiment of the invention, with reference to the drawings, wherein.

DETAILED DESCRIPTION OF THE INVENTION

Figure 1A:
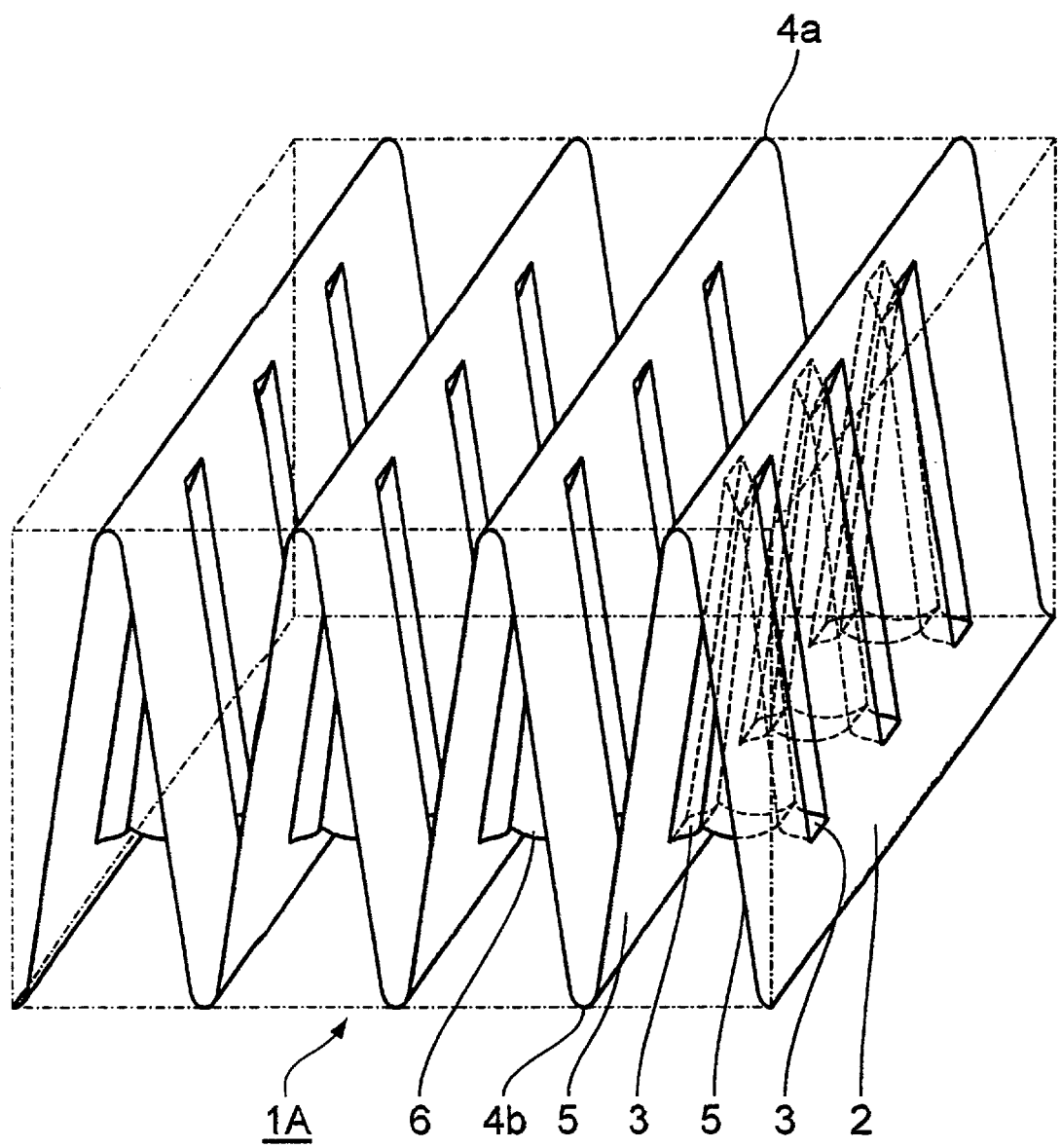
FIGS. 1a to 1d are perspective schematic diagrams of filter inserts according to the embodiments of the invention.

FIG. 1a shows, in highly simplified form, a filter insert 1A, which is substantially box-shaped in its outer configuration, consisting of a glass fibre filter fleece 2 impregnated with synthetic resin, which is provided with corrugation-like depressions 3 stamped on one side and is folded in a substantially zigzag-shaped with (slightly rounded) upper and lower fold edges 4a and 4b, so that the depressions 3 stamped in face each other in every two adjacent fold walls 5. The depressions or corrugations 3 are at an increasing distance from the lower fold edges 4b, ie. as the width of opening of the folds increases.

The fold spacings of the folds are made so great (in order to achieve certain parameters of use) that the top surfaces of depressions 3 located opposite one another do not touch one another.

On each of the top surfaces 3a is a layer of adhesive 6 which becomes thicker towards the lower fold edges 4b. The adhesive layers of top surfaces 3a lying opposite one another are joined together, as a result of which (once the adhesive has cured) the opposing depressions 3 and hence the corresponding fold walls 5 are firmly joined together and support one another substantially rigidly so that the filter insert 1 is mechanically rigid.

Figure 1B:
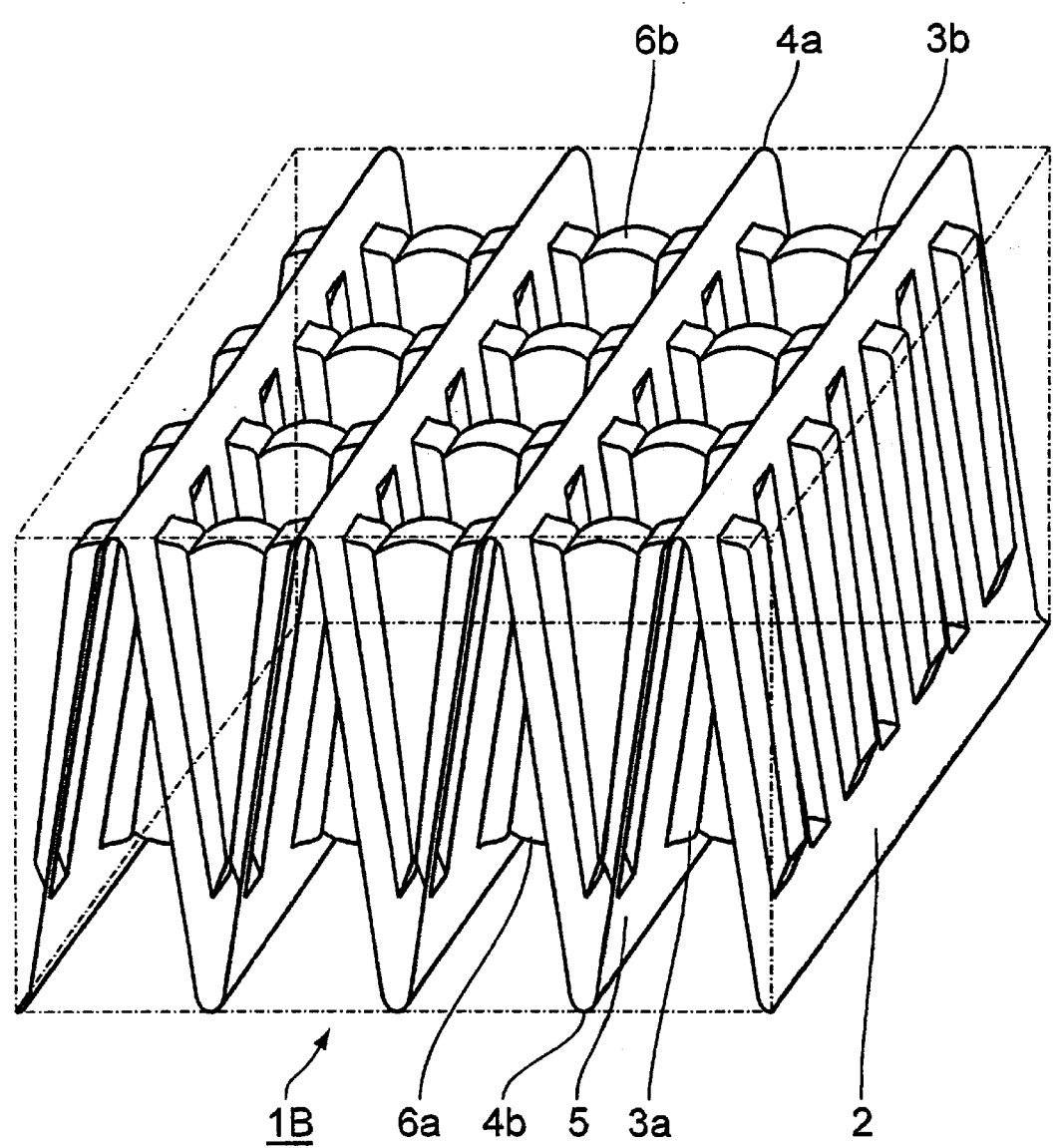

FIG. 1b shows a filter insert 1B modified from the embodiment in FIG. 1a, in which corrugations 3a and 3b and spacers (adhesive aggregates) 6a and 6b are provided on both sides of each fold wall 5; see also the description of FIGS. 3a and 3c hereinafter.

Figure 2A:
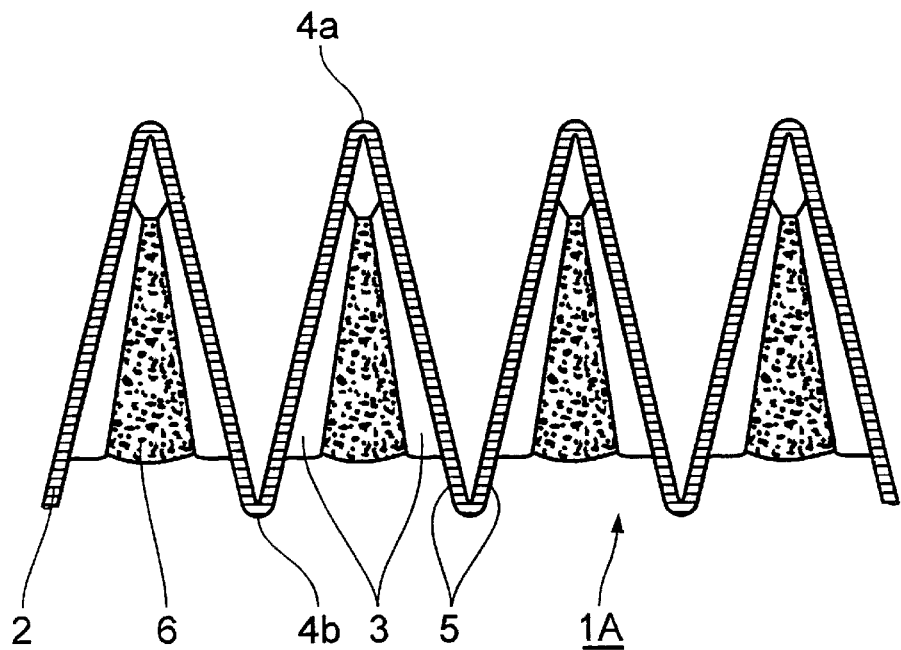
FIGS. 2a and 2c are diagrammatic cross sectional views of the fold arrangements (perpendicularly to the fold edges) in special embodiments of filter inserts similar to that in FIG. 1a, FIGS. 3a to 3c are diagrammatic cross sectional views of the fold arrangements (at right angles to the fold edges) in particular embodiments of filter inserts similar to that in FIG. 1b, FIGS. 4a to 4d are diagrammatic cross sectional views of the fold arrangements (at right angles to the fold edges) in particular embodiments of filter inserts similar to that in FIG. 1c, FIGS. 5a to 5d are diagrammatic cross sectional views of the fold arrangements (at right angles to the fold edges) in particular embodiments of filter inserts similar to that in FIG. 1d.

FIG. 2a shows a cross sectional representation of the fold arrangement of the filter insert 1A shown in FIG. 1a in a sectional plane parallel to the longitudinal extent of the spacers. Here, the increase in height of both the corrugations (depressions) 3 and also the adhesive layers 6 from the upper to the lower fold edges can be seen very distinctly.

Figure 2B:
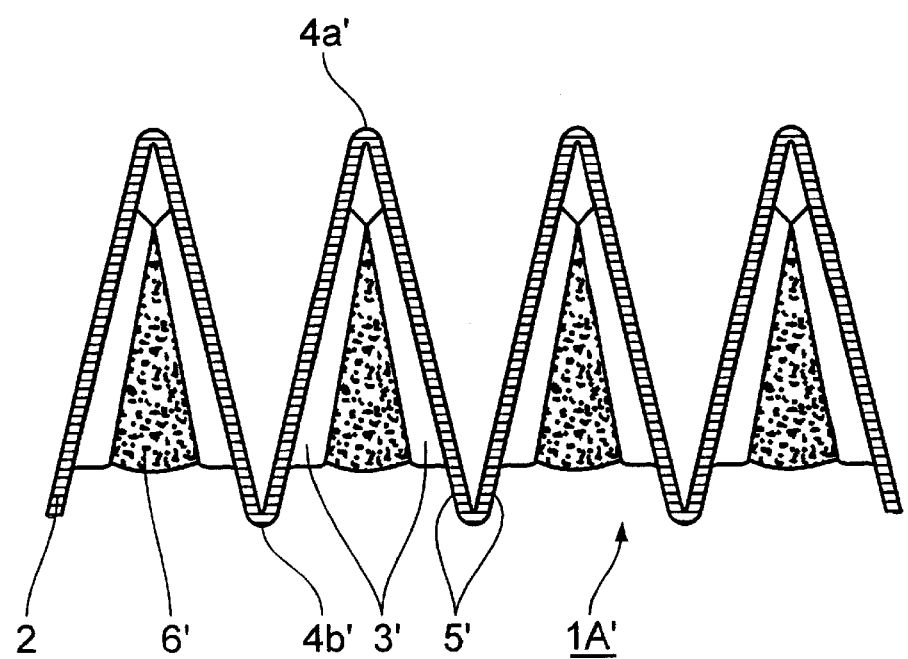

FIG. 2b shows an alternative embodiment of a filter insert 1A', in which, in a basic arrangement similar to FIG. 2a, the fold walls are constructed as wells 5' with corrugations 3' having a substantially constant height over their longitudinal extent, whilst the increase in thickness of the adhesive layers 6' from the upper fold edge area 4a' to the lower fold edge area 4b'—with about the same fold angle—is more marked than in the arrangement according to FIG. 2a.

Figure 2C:
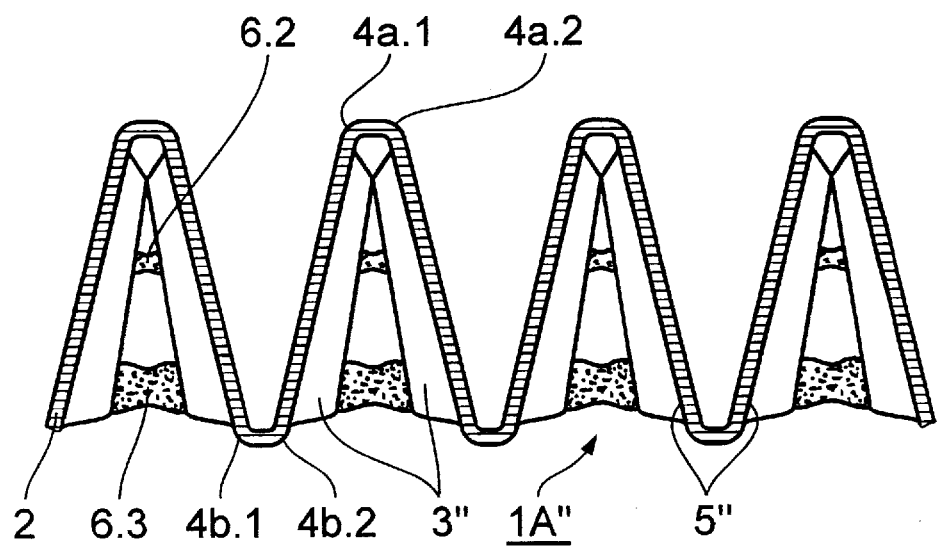

FIG. 2c shows a filter element 1A" according to another embodiment, in which the cross section of the fold is trapezoidal, so that two fold lines 4a.1, 4a.2 (upper fold edges) and 4b.1, 4b.2 (lower fold edges) are provided between successive fold walls 5". The fold walls 5" have corrugations 3" impressed therein, which extend from the upper fold edges to the lower fold edges and have a constant height over this extent. In the upper part, the corrugations 3" each have a relatively small dot of adhesive 6.2 and near the lower end next to the lower fold edges they have a substantially bulkier, hemispherical adhesive aggregate 6.3, in accordance with the fold spacing which is larger here. The individual adhesive aggregates on the corrugations 3" of adjacent fold walls are fused together, so that the fold walls 5" are fixedly connected to one another by this means.

Figure 3A:
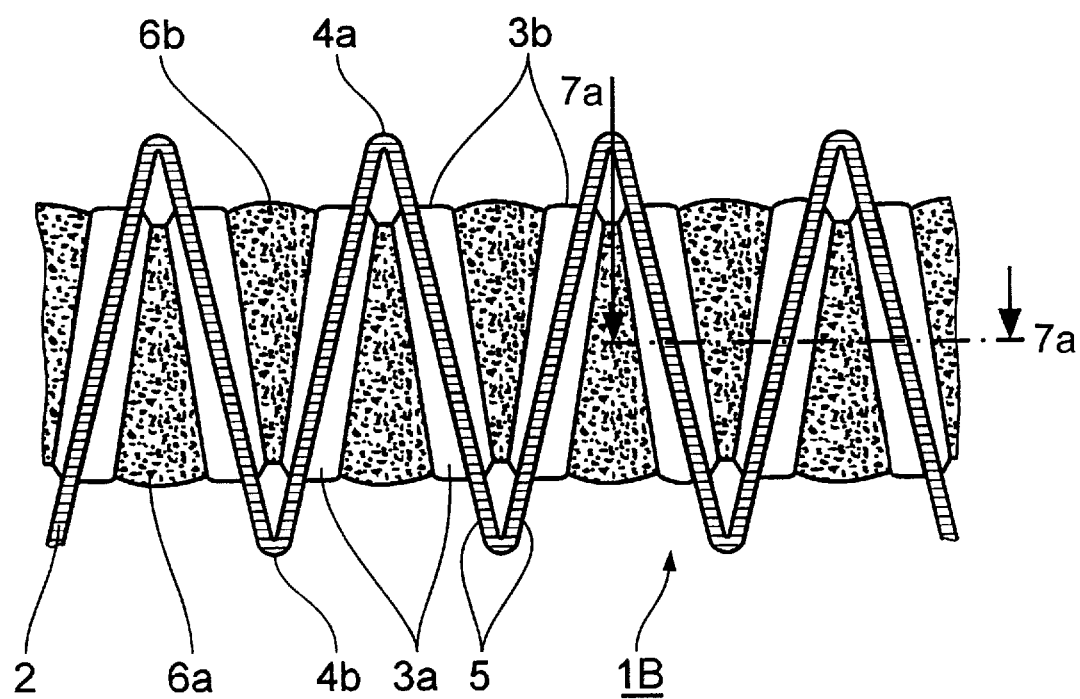

FIG. 3a shows a cross sectional view of the filter element 1B according to FIG. 1b, wherein fold walls are provided which have corrugations 3a and 3b on both sides, ie. both depressions and elevations. (the other reference numerals from FIGS. 1a and 3a have been retained in the interest of simplicity.) The opposing elevations or recesses 3a and 3b are joined together, as in FIG. 3a, by means of a composite adhesive aggregate, whilst as a result of the attachment of adjacent fold walls at every point, a filter bundle is obtained which has a high degree of compressive and tensile strength and is also strongly constructed to withstand strong flows with turbulent components or substantial changes in pressure over the course of time.

Figure 3B:
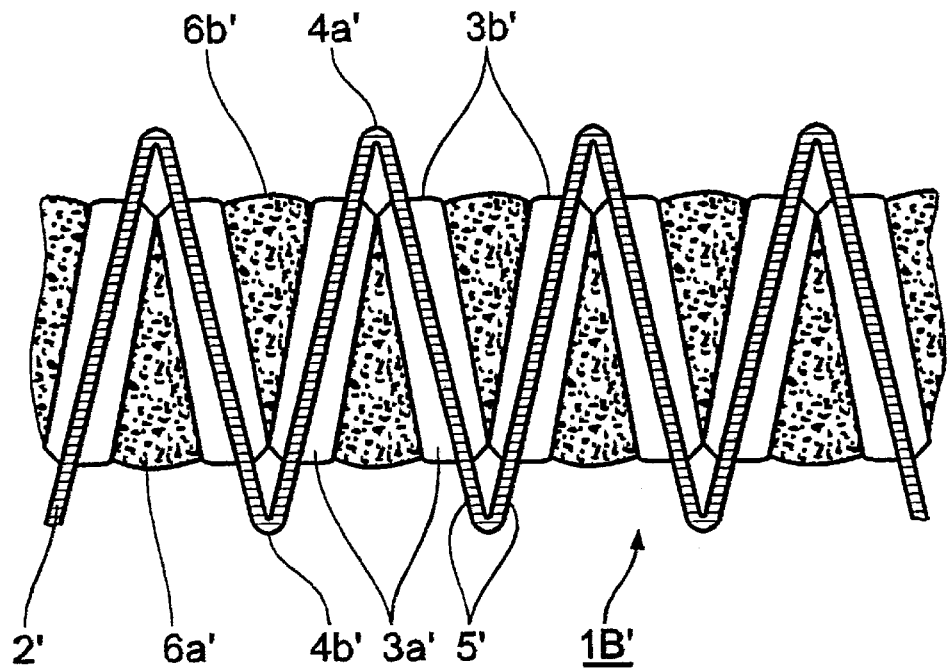
Figure 3C:
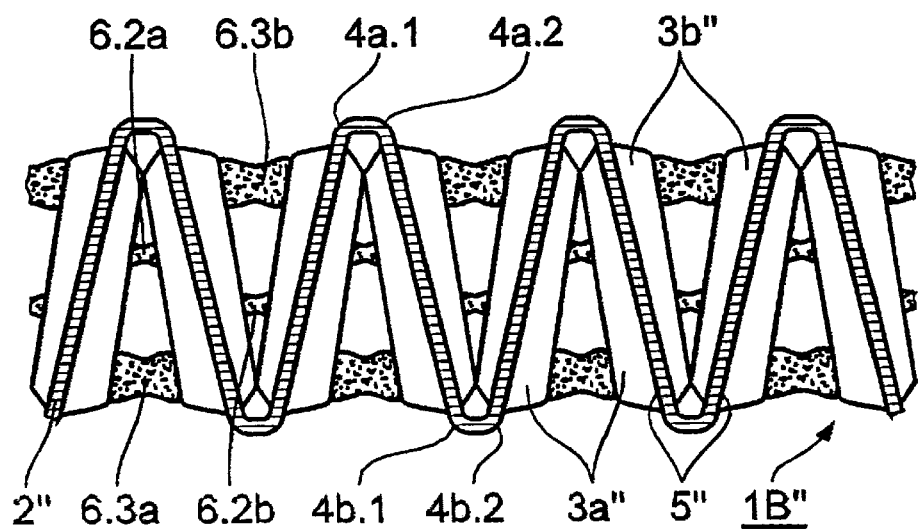

An analogous construction with corrugations and adhesive aggregates provided on each side of each fold wall is also possible in the arrangements according to FIGS. 2b and 2c. These embodiments are shown in FIGS. 3b and 3c, in which the same reference numerals have been used to denote components similar to those in the preceding figures, so that no special description is required here.

Figure 1C:
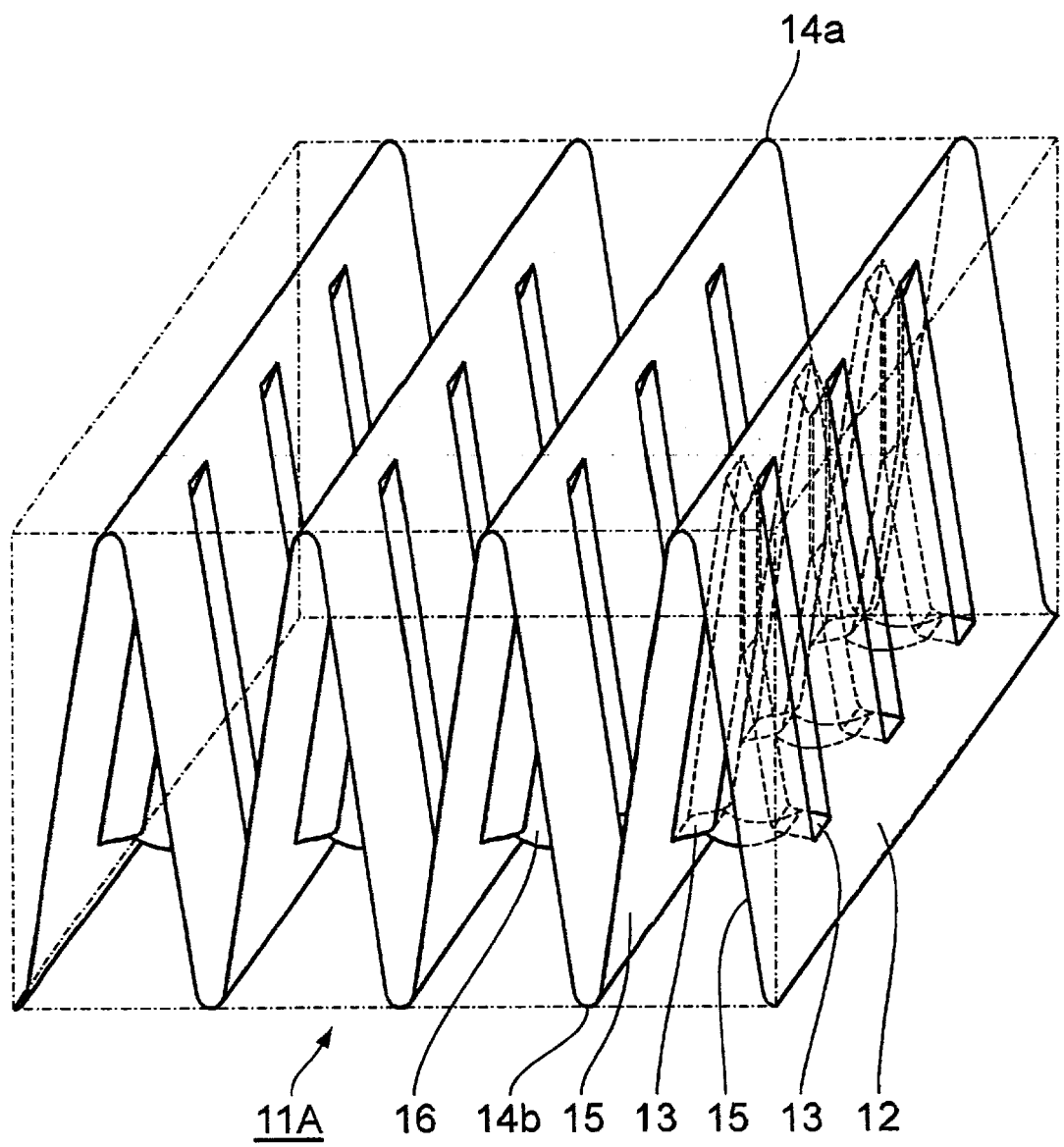

FIG. 1c shows, in a view corresponding to FIG. 1a, a substantially box-shaped filter insert 11A made up of a glass fibre filter fleece 12 with corrugation-like recesses or elevations 13 stamped on one side, which is folded in an approximately zigzag shaped, with slightly rounded upper and lower fold edges 14a and 14b, so that the elevations 13 stamped into adjacent fold walls 15 face one another.

Referring additionally to FIGS. 4a to 4d in which the shape of the corrugations can be seen more clearly, the corrugations 13 begin at a spacing from the fold edges 14a which are at the top (in the drawing) and, in addition to the short approach area which is technologically necessary in stamped-in depressions and elevations, they have a first section $l_2$ the height of which increases towards the lower fold edges 74b, ie. as the width of opening of the folds increases, and a second section $l_3$ of constant height.

Figure 1D:
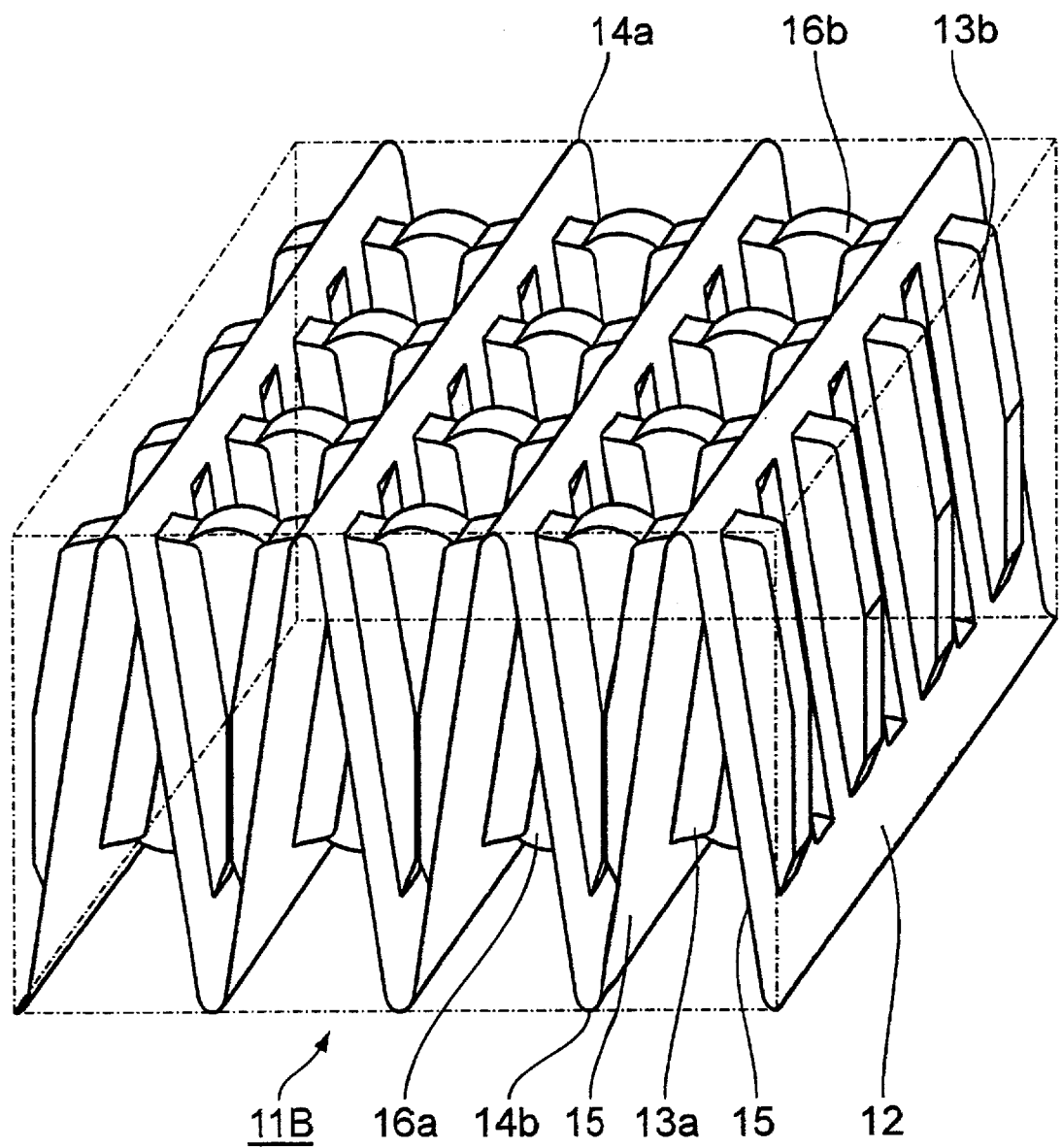

FIG. 1d shows a filter insert 11B which is modified from the embodiment in FIG. 1c and wherein corrugations 13a and 13b and spacers (adhesive aggregates) 16a and 16b are provided on both sides of each fold wall 15; see also FIGS. 5a to 5d and the corresponding description hereinafter.

In both filter inserts 11A and 11B, on each of the top surfaces of the corrugations is provided a layer of adhesive 16 which is in initially thin in the first section $l_2$, but become steadily thicker in the second section $l_3$ in the direction of the lower fold edges. The adhesive layers on opposing corrugations are joined together, as a result of which, once the adhesive has cured, these corrugations and hence the corresponding fold walls are firmly joined together and the filter insert forms a mechanically rigid structure.

FIGS. 4a to 4d are diagrammatic cross sectional views of the fold arrangements and additional spacers of filter inserts (perpendicular to the fold edges) in box-shaped filter inserts according to various embodiments essentially corresponding to FIG. 1c in their overall appearance.

Figure 4A:
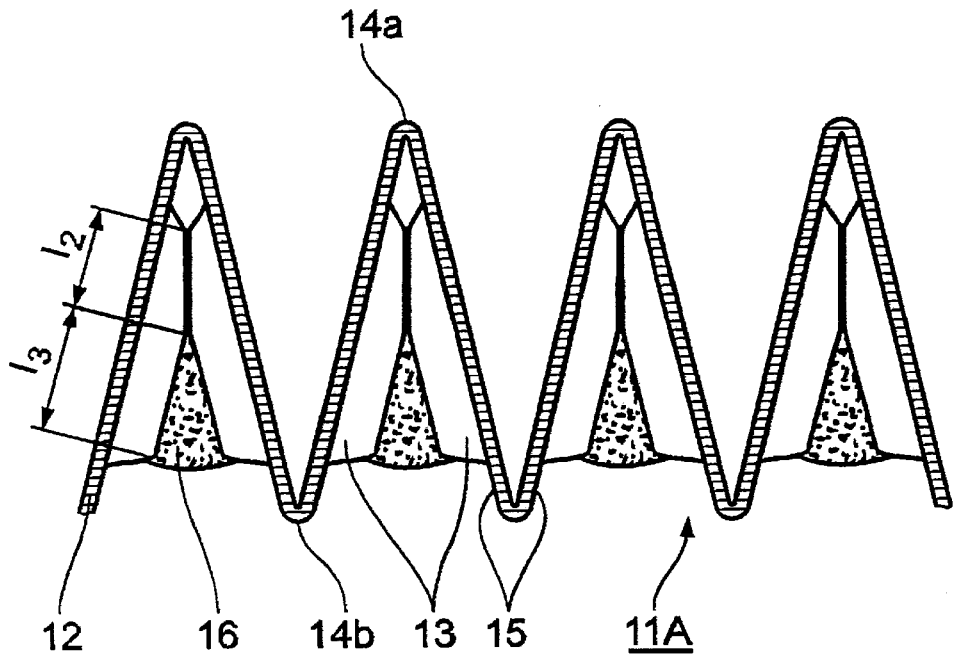

FIG. 4a, first of all, shows the embodiment according to FIG. 1c, again in cross section, using the reference numerals provided therein.

Figure 4B:
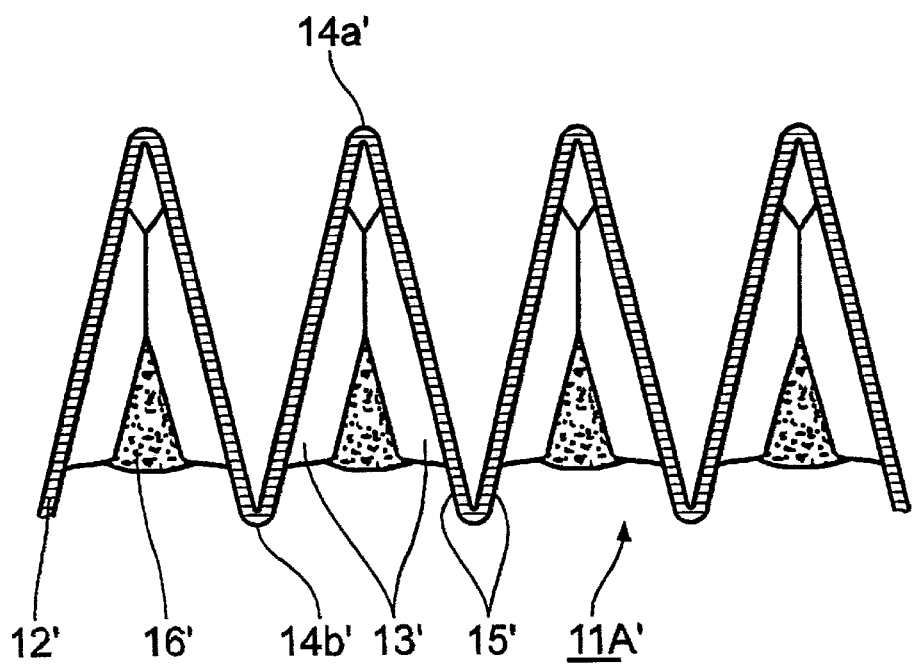

FIG. 4b shows another filter insert 11A' with a basic arrangement identical to FIG. 4a (the elements of which are marked with corresponding reference numerals). However, here, the elevations 13' of the fold walls 15' only have spacers 16' connected them and resting on one another in the region $l_3$ of constant height, whereas in the region $l_2$ they are in direct contact with one another and rest on one another. Here, if securing to prevent lateral movement seems necessary in addition to the fixing in the region $l_3$, suitable profiling of the facing top surfaces of the corrugations may be provided to enable them to lock together during folding.

The spacers 16' may be produced by the application of adhesive of a correspondingly increasing thickness to the top surfaces of one or both of the facing corrugations 13, followed by curing of the adhesive in the area $l_3$. However, it is also possible to use prefabricated spacers of the triangular cross sectional shape shown in the drawing during or possibly immediately after the folding into the bundle of folds.

Figure 4C:
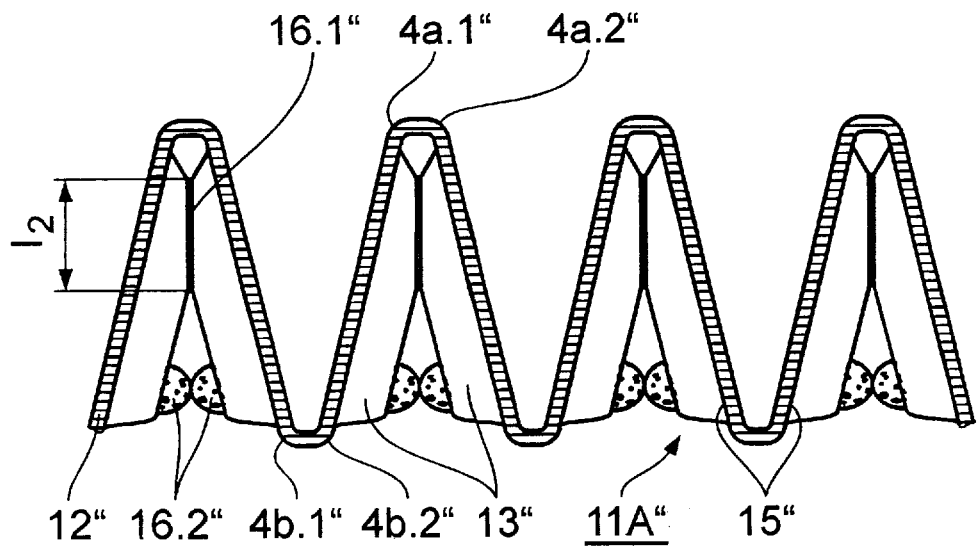

Another filter insert 11A", in which the folds are of a completely different shape and the elevations 13" are not joined together over their entire length, is shown in FIG. 4c. (Here again, parts corresponding to those in FIGS. 4a and 4b have been given the same reference numerals.) Adjacent fold walls 15" are joined together here by means of a double fold edge 4a.1", 4a.2" or 4b.1", 4b.2", as obtained by forming the fold edge impression lines by roller-stamping using rectangular stamping strips. Once again, the elevations in the section $l_2$ in which they rest against one another are adhered together by means of a thin layer of adhesive 16.1", and additionally a highly viscous drop of adhesive 16.2" is applied to each elevation on the end of the section $l_3$ remote from the section $l_2$, this drop being of such dimensions that two drops of adhesive 16.2" coming into contact will precisely bridge the gap between the fold walls at the site of application thereof and will join these walls together.

Figure 4D:
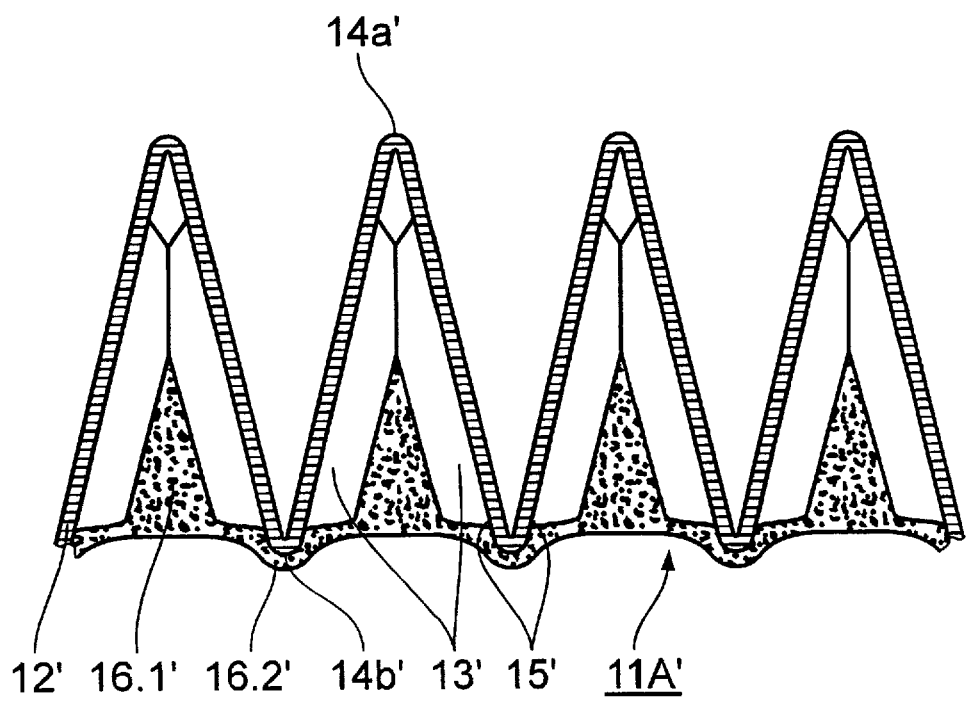

FIG. 4d shows another embodiment very similar to the arrangement according to FIG. 4b, in which again the same reference numerals are used as in FIG. 4b, but wherein the spacers have a section 16.1' located between the corrugations 13', and a section 16.2' overlapping the fold edges. This construction can be achieved by a single application of adhesive of suitable magnitude—before or after folding—but it is also possible for an additional continuous thread of adhesive to be applied to the fold edge section subsequently. Instead of adhesive, a (previously crosslinked) plastics or foam filament or the like may be used, according to another modified embodiment.

Figure 5A:
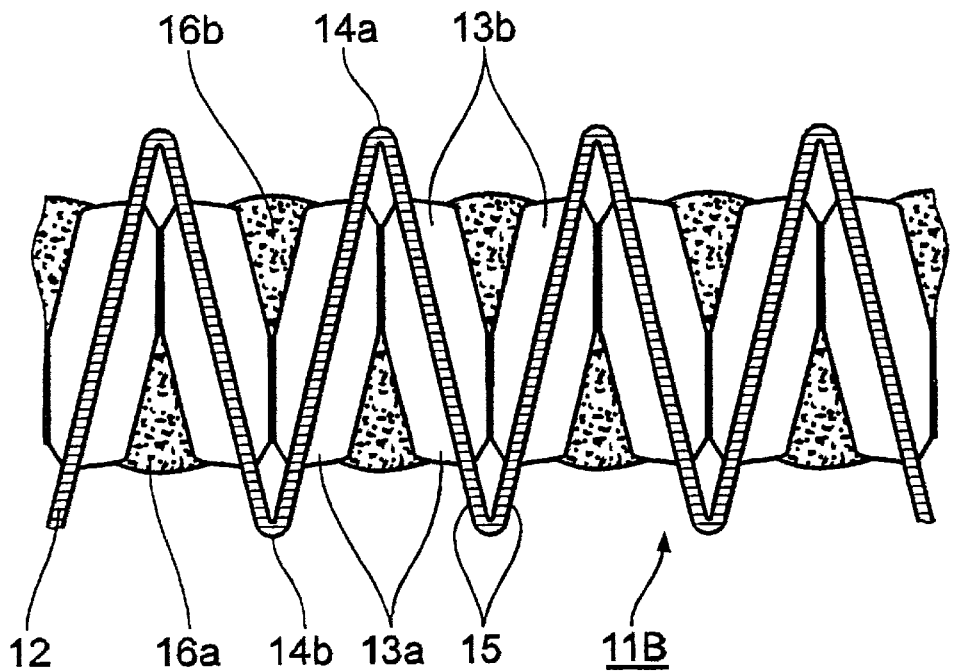

FIG. 5a shows a cross sectional view of the filter element 11B according to FIG. 1d, in which fold walls are provided which have on both sides corrugations 13a and 13b, ie. both indentations and elevations. (The other reference numerals used in FIG. 1d have been retained in the interest of simplicity.) The opposing elevations or indentations 3a and 3b are joined together, as in FIG. 4a, by a composite adhesive aggregate, so as to obtain, by means of the overall attachment of adjacent fold walls, a filter bundle having a high degree of compressive and tensile strength and consequently good resistance to deformation even when subjected to strong currents with turbulent components or considerable pressure variations in the course of time.

Figure 5B:
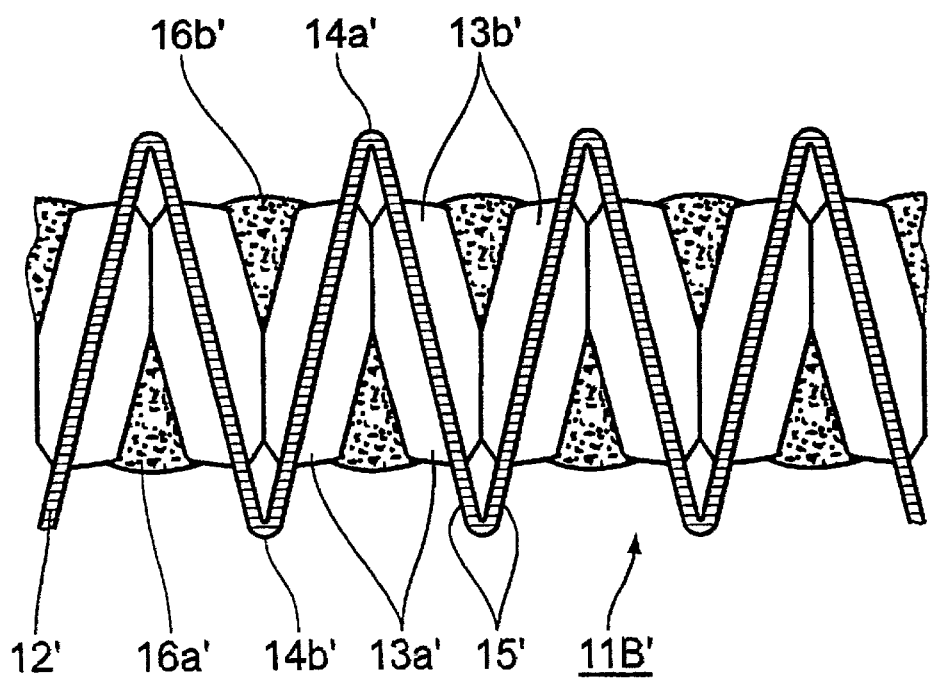
Figure 5C:
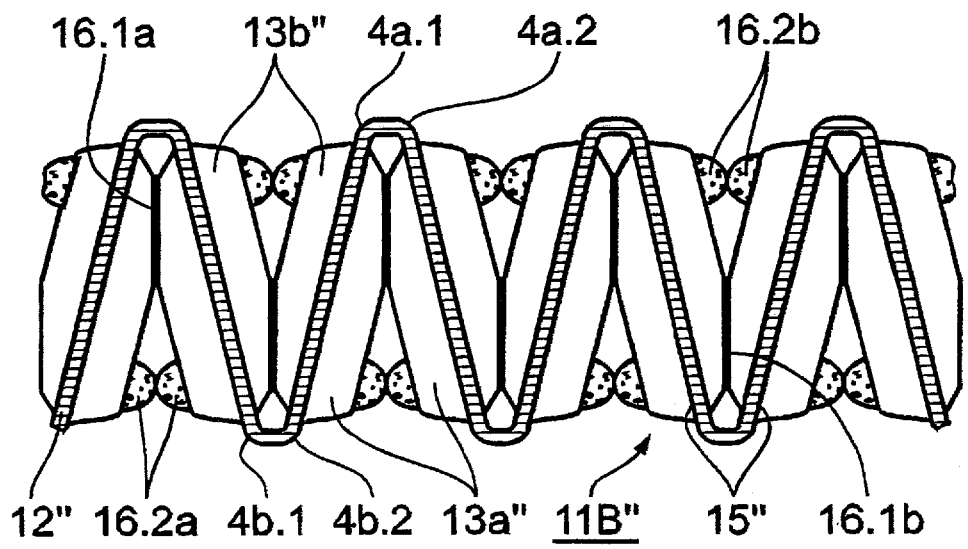
Figure 5D:
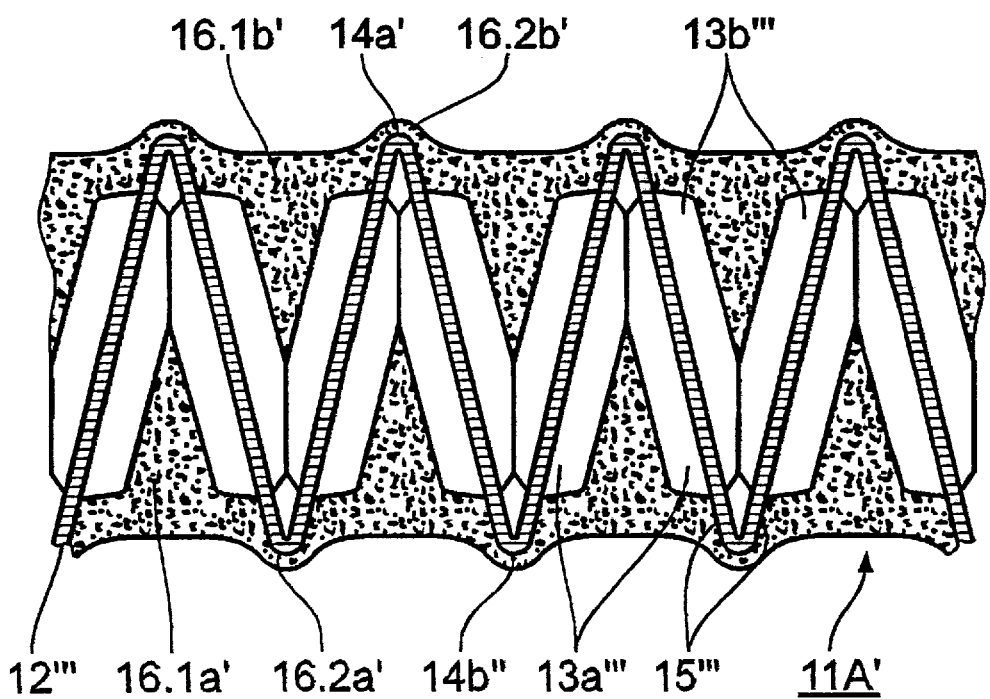

An analogous construction with corrugations and adhesive aggregates provided on both sides of each fold wall is also possible in the arrangements according to FIGS. 4b to 4d. These embodiments are shown in FIGS. 5b and 5e, in which reference numerals for similar components correspond to those used in the preceding figures and no separate description is required.

Figure 6:
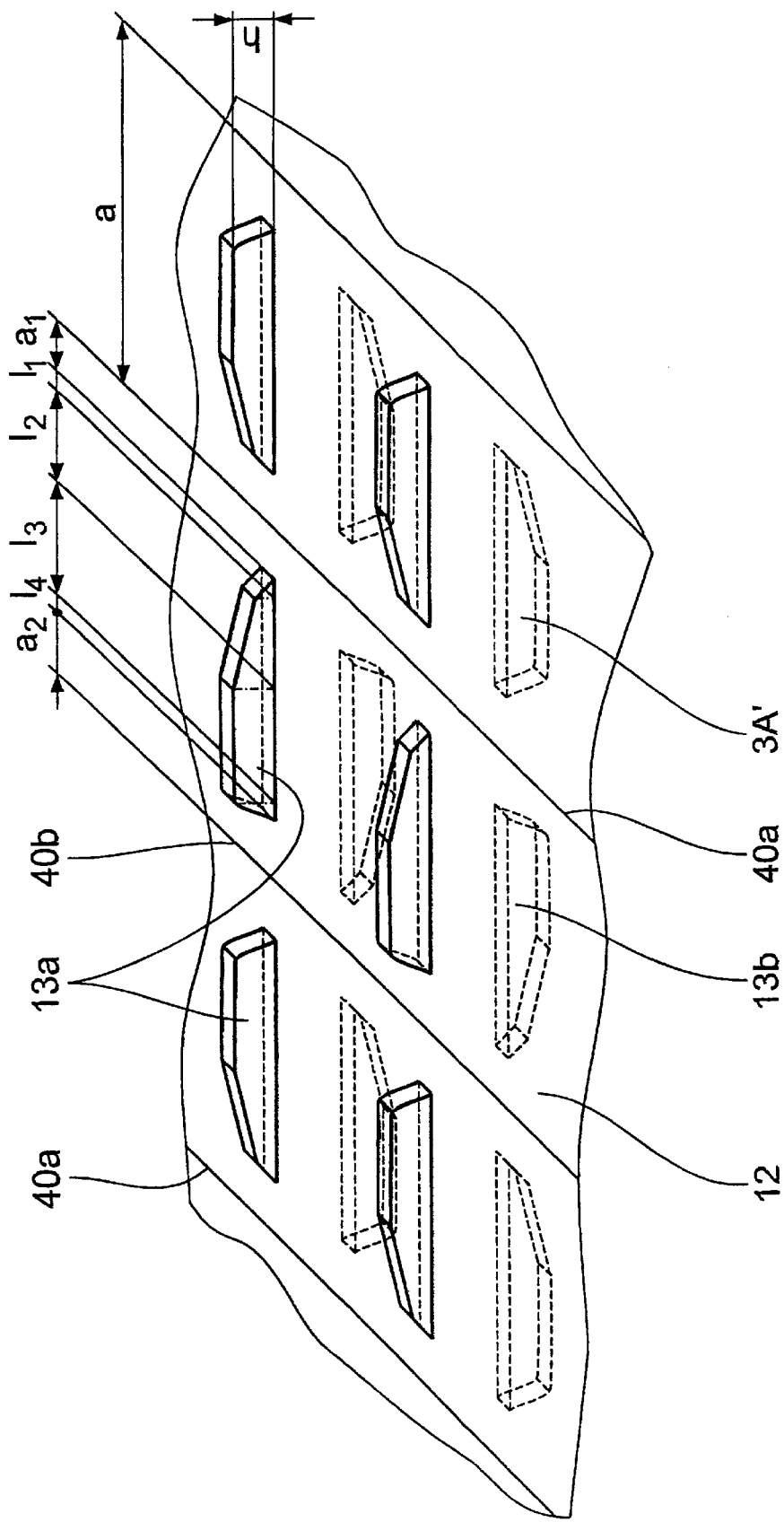
FIG. 6 is a diagrammatic cut-away view of a stamped length of filter material as an intermediate product for producing a filter insert according to FIGS. 5a to 5d, FIGS. 7a and 7b are diagrammatic cross sectional views of the fold arrangements (parallel to the fold edges) in a filter insert according to FIG. 1d or a modified embodiment thereof

FIG. 6 is a diagrammatic perspective view of the impressed filter fleece 12 for the filter insert 11B according to FIG. 1d or 5a.

The figure shows that the filter fleece 12 (shown cut away) consisting of short glass fibres impregnated with a small amount of synthetic resin, has indication lines 40a,40b running in the direction of its longitudinal dimension 1, at a spacing a, perpendicular to the longitudinal dimension, these lines 40a,40b determining the position of the fold edges 14a and 14b during subsequent folding (cf FIG. 1d). Moreover, indentations 13a and elevations 13b are stamped into the filter fleece 12 between two adjacent indentation lines 40a, 40b, these indentations and elevations extending longitudinally (as shown exaggeratedly in the other figures), the indentations and elevations alternating at right angles to the longitudinal direction of the fleece.

In the embodiment shown, the indentations 13a and elevations 13b start at a spacing $a_1$ from an adjacent fold edge indentation line 40a or 40b with a relatively sharply ascending section $l_1$, followed by a more gently ascending section $l_2$, and then continue, in a section $l_3$ parallel to the surface of the unstamped areas of the fleece, with a height h which is followed by a transitional section $l_4$ of steep pitch which returns to the unstamped surface, before the next fold edge indentation line 40a or 40b follows (at a spacing $a_2$).

In the indentation of the fleece, the magnitude a determines the height of the fold and consequently the height of the filter insert 11B after folding, whereas the rise in the section $l_1$, in which according to FIG. 1d the fold walls 15 abut on one another after folding, determines the angle enclosed by the fold walls. The magnitude h is chosen so that there is no risk of punching through, taking account of the properties of the particular filter fleece. The greater h is, for a given rise in the section $l_1$, the longer $l_1$ can be made, ie. the longer the distance over which the top surfaces of the elevations or depressions facing one another during folding can abut on one another.

Fundamentally, in order to produce the most rigid possible filter insert, a high value for the ration $l_1/a$ is desirable—the greater the value of a in order to provide highly efficient filters, the more critical the effect of the fact that, as $l_2$ increases and the angle of inclination of the fold walls remains constant, h increases as well and thus the risk of tearing of the filter fleece is increased. In arrangements according to the prior art having substantially wedge-shaped corrugations, in cross section, with no additional spacers, this meant that the achievable fold height and hence the height of the filter insert were subject to narrow limits, for a given angle of inclination of the fold walls.

With the construction of the invention as described, the height h of the corrugations is limited to a value which is not critical in terms of the risk of tearing, and after this value is achieved in the course of the rise in the region $l_2$ the corrugations have a constant height h as they continue their path (area $l_3$); starting from this constant height, additional elements may be added which support the adjacent fold walls against one another in this area and join them together.

Figure 7A:
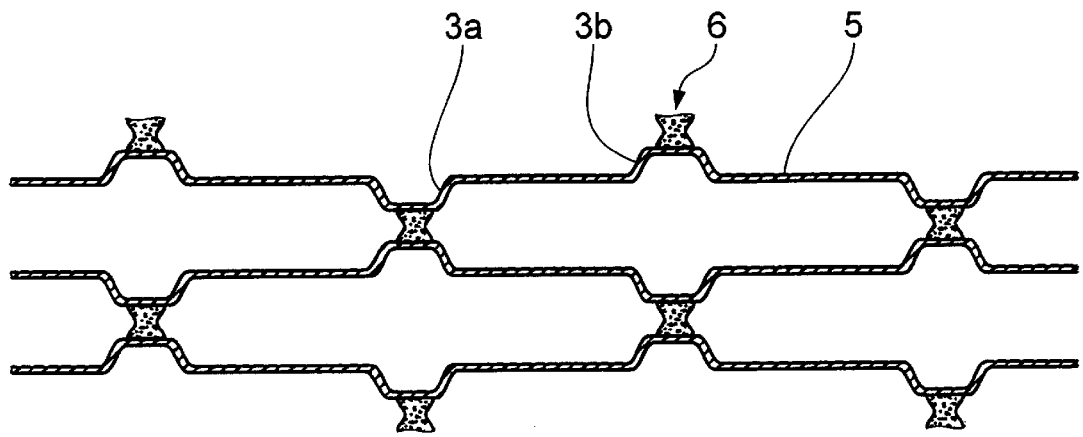

FIG. 7a shows a cross sectional view of two folds of a folded construction according to FIG. 4a in a plane parallel to the fold edge section (along the line a—A in FIG. 3a) in an embodiment in which the reduced width in the central part of the adhesive aggregates can be seen.

Figure 7B:
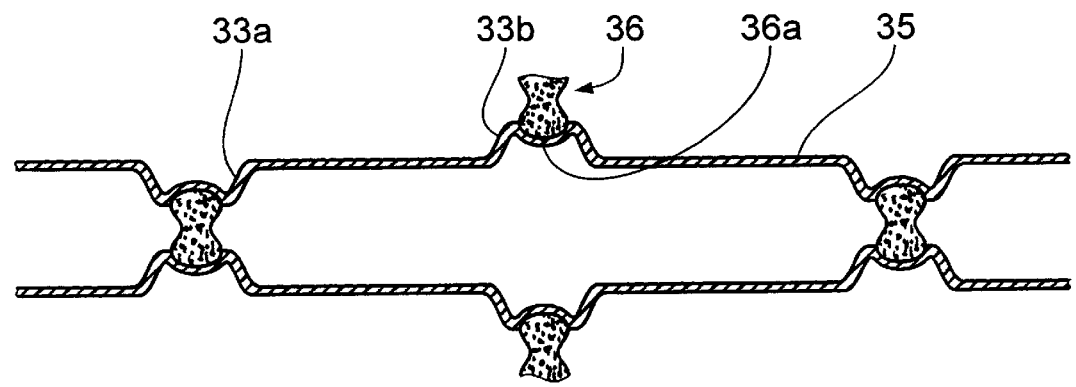

FIG. 7b shows a modification of this arrangement, in which the corrugations 33a and 33b in the fold walls 35 are profiled so as to have a central longitudinal groove 36a in which a ribbon of adhesive 36 of relatively narrow width is located, having a substantially semi-circular contact surface with the corrugation, in section, which is precisely defined by the walls of the groove. Here, corrugations facing one another are joined only by one application of adhesive, in the form of the thread 36 in a groove 36a which is formed adjacent thereto as a result of the folding operation. The final bone-like cross sectional shape of the spacer is formed as a result of the fact that this thread is first brought into contact with the opposing groove and adhered thereto and then stretched transversely, whilst still plastic, in a two-step folding process.

The arrangement according to FIG. 7b with inherently profiled corrugations has the advantage that the adhesive is applied over the minimum extent with a precisely defined lateral dimension, so as to avoid smearing on the filter material and maximise the effective filter surface.

Figure 8:
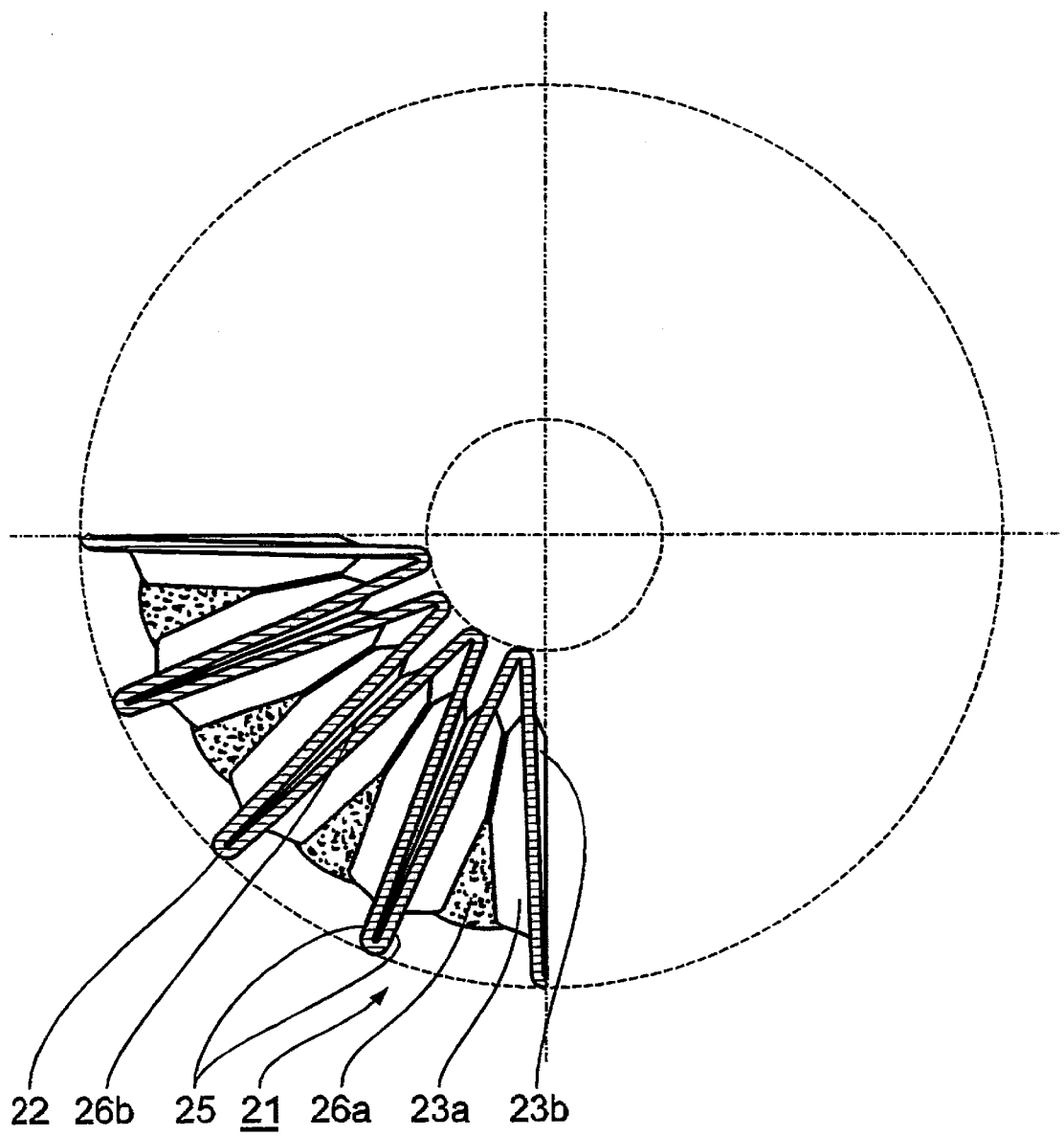
FIG. 8 is a diagrammatic cross sectional representation of the fold arrangement (perpendicular to the fold edges) in an embodiment of a hollow cylindrical filter insert.

FIG. 8 is a diagrammatic cross sectional view of part of a filter insert 21, which is hollow cylindrical in its outer configuration, according to another embodiment of the invention. The inner structure is roughly equivalent to that of a box-shaped filter insert; the parts are therefore numbered in accordance with the above drawings and the structure is provided only where it differs from the box-shaped filter insert.

As can be seen from FIG. 8, the hollow cylindrical outer configuration of the filter insert 21 is asymmetrical both between the shape of the depressions 23a and elevations 23b in the fold walls 25 and also in terms of the application of adhesive to the surfaces of the fold walls facing the inside of the insert compared with those facing the outside:

The depressions 23a facing the outside are of the same shape and have a very similar application of adhesive 26a to the elevations and depressions in the filter inserts shown in FIGS. 1c and 1d. On the other hand, the elevations 23b of the filter fleece 22 facing the inside of the filter insert are simply wedge-shaped in cross section, on account of the smaller maximum spacing of the fold walls which is essential here, and they are adhered together using a thin, uniform application of adhesive 26b.

This construction can also be modified, depending on the fold height and the permitted height of indentation of the filter fleece, so that the corrugations facing the inside of the filter are also other than wedge-shaped and in particular are shaped similar to the corrugations in FIG. 2, but in the hollow cylindrical filter insert the shape of the elevations will generally differ from that of the depressions.

The invention is not restricted in its embodiments to those given here by way of example. Rather, a variety of alternatives are conceivable, particularly with regard to the geometry and combination of impressions in the filter material and the layers applied thereto, which make use of the solution illustrated but in a fundamentally different form.

I claim:

1. A filter insert for a fluid filter, comprising:
    a material permeable to fluid and having a number of planar fold walls arranged in a substantially continuous zigzag shape and including depressions and/or elevations stamped into the plane of at least a part of a respective one of the fold walls in order to stiffen the fold walls, wherein the depressions and/or elevations each have a face with a longitudinal extent and two side walls, and adjacent fold walls connected at a common fold edge define a fold;
    a spacing between the longitudinal faces of the depressions and/or elevations of adjacent fold walls, said spacing having a thickness greater than that of the permeable material; and
    rigid spacers being placed in said spacing and joining a part of the longitudinal extent of the depressions and/or elevations of adjacent fold walls to achieve the spacing between the longitudinal faces of the depressions and/or elevations of adjacent fold walls.

2. The filter insert according to claim 1, wherein the rigid spacers comprise cured adhesive aggregates.

3. The filter insert according to claim 1, wherein the rigid spacers have a first length and a second length; said first length having a constant thickness and said second length having a non-constant increasing thickness in a direction of the longitudinal extent of the depression and/or elevations.

4. The filter insert according to claim 1, wherein each rigid spacer becomes continuously thinner in accordance with a cross-sectional narrowing of a fold towards the common fold edge.

5. The filter insert according to claim 1, wherein the rigid spacers comprise a plurality of rigid spacers each having different thickness in a direction of the longitudinal extent of the depressions and/or elevations joined by the rigid spacers.

6. The filter insert according to claim 1, wherein the rigid spacers comprise an adhesive layer of appreciable height only in a part of the fold in which the adjacent fold walls are at a considerable spacing from one another.

7. The filter insert according to claim 1, wherein the respective depressions and/or elevations each have a constant height in a direction of the longitudinal extent of the depression and/or elevation.

8. The filter insert according to claim 1, wherein the respective depressions and/or elevations in adjacent fold walls each have a height that decreases toward the common fold edge.

9. The filter insert according to claim 1, wherein the respective depressions and/or elevations each have a height which increases over a first part of the longitudinal extent in the same direction as the spacing between adjacent fold walls increases and which remains constant over a second part of the longitudinal extent adjoining the first part.

10. The filter insert according to claim 9, wherein the rigid spacers comprise an adhesive aggregate joining opposing depressions and/or elevations of adjacent walls at least in a section of the second part of the longitudinal extent of the depressions and/or elevations, and the adhesive aggregate in the section of the second part has a thickness which when combined with a sum of the constant heights of the opposing depressions and/or elevations in the section of the second parts joined by the adhesive aggregate corresponds to the spacing between the adjacent fold walls at a location of the adhesive aggregate so that the adjacent fold walls are supported on one another by the elevations and/or depressions and the adhesive aggregate joining such elevations and/or depressions.

11. The filter insert according to claim 10, wherein the adhesive aggregate comprises a layer of adhesive running in a direction of the longitudinal extent of the depressions and/or elevations, substantially covering the second part of the longitudinal extent of the respective depressions and/or elevations, and having a thickness that increases in the direction of the longitudinal extent as the spacing increases from the first part of the depression and/or elevation.

12. The filter insert according to claim 1, wherein the depressions and/or elevations begin substantially directly at one of the fold edges.

13. The filter insert according to claim 1, wherein the depressions and/or elevations being at a predetermined spacing from a fold edge, and the depressions and/or elevations have a section with a height that increases by more than half of a spacing of the fold walls.

14. The filter insert according to claim 1, wherein the fold walls have opposite sides and the fold walls have alternating depressions and elevations directed towards both sides, respectively, so that the fold walls are supported on both sides by adjacent fold walls.

15. The filter insert according to claim 1, wherein the filter insert has a box shape.

16. The filter insert according to claim 1, wherein the filter insert has a cylindrical outer shape.

17. A process for preparing a filter insert for a fluid filter, comprising steps of:
    providing a length of fluid-permeable material with a layer of impressions which determine future fold edges that define future fold walls when the material is folded along the impressions;
    stamping depressions and/or elevations into a plane of at least a part of the future fold walls in order to reinforce the future fold walls;
    folding the material along the impressions to form fold edges and to form a substantially continuous zigzag shape so that the depressions and/or elevations of adjacent fold walls are placed together with a space therebetween, said space having a thickness greater than the permeable material; and
    applying, before or during the folding, a spacer material to at least one of the depressions and/or elevations placed together as a result of the folding to achieve the spacing between the depressions and/or elevations of adjacent fold walls.

18. The process according to claim 17, wherein the applying step includes applying an adhesive to a length of the depressions and/or elevations, and curing the adhesive to form the spacers.

19. The process according to claim 18, wherein the curing step is performed during and/or after the folding step.

20. The process according to claim 18, wherein the applying step includes applying the adhesive with an applicator which changes the quantity of adhesive applied by varying the quantity of adhesive applied per unit of time.

21. The process according to claim 18, wherein the applying step includes making a number of applications of the adhesive one above the other on an area provided for forming the spacer material.

22. The process according to claim 17, wherein the applying step includes applying the adhesive aggregate to a predetermined height in points or along a line to a predetermined section of the depressions and/or elevations.

23. The process according to claim 17, wherein the applying step includes changing the quantity of adhesive applied per unit of length by varying a relative speed between a length of material and an outlet opening of an applicator device utilized for applying the adhesive.

* * * * *